(12) United States Patent
Chen et al.

(10) Patent No.: US 7,700,193 B2
(45) Date of Patent: Apr. 20, 2010

(54) CORE-SHELL STRUCTURE WITH MAGNETIC, THERMAL, AND OPTICAL CHARACTERISTICS AND MANUFACTURING METHOD THEREOF

(75) Inventors: Ming-Yao Chen, Taipei (TW); Wen-Hsiang Chang, Taipei (TW); Chin-I Lin, Tainan (TW); Shian-Jy Jassy Wang, Hsinchu (TW); Yuh-Jiuan Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1238 days.

(21) Appl. No.: 11/237,681

(22) Filed: Sep. 29, 2005

(65) Prior Publication Data

US 2006/0228551 A1    Oct. 12, 2006

(51) Int. Cl.
*B32B 5/16* (2006.01)

(52) U.S. Cl. ............ 428/403; 428/570; 428/692.1; 428/693.1; 428/699; 428/701; 428/900; 977/779

(58) Field of Classification Search ............ 428/403, 428/570, 692.1, 693.1, 699, 701, 900; 977/773, 977/779
See application file for complete search history.

(56) References Cited

U.S. PATENT DOCUMENTS 6,685,730 B2 * 2/2004 West et al. ............... 607/89
6,783,569 B2 * 8/2004 Cheon et al. ............. 75/348
7,135,055 B2 * 11/2006 Mirkin et al. ............ 75/343
7,175,912 B2 * 2/2007 Cui et al. ................ 428/403
7,291,394 B2 * 11/2007 Winkler et al. ........... 428/403

FOREIGN PATENT DOCUMENTS

EP    0977212 A2    2/2000

OTHER PUBLICATIONS

Yong Taik Lim et al., "Gold nanolayer-encapsulated silica particles synthesized by surface seeding and shell growing method: near infrared responsive materials," Journal of Colloid and Interface Science, Academic Press Inc. US, vol. 263, No. 2 (Jul. 15, 2003), pp. 449-453, XP002537115.
Lingyan Wang et al., "Iron oxide-gold core-shell nanoparticles and thin film assembly," Journal of Materials Chemistry, vol. 15, No. 18 (Mar. 4, 2005), pp. 1821-1832, XP002537116, ISSN: 0959-9428.
Jennifer L. Lyon et al., "Synthesis of Fe Oxide Core/Au Shell Nanoparticles by Iterative Hydroxylamine Seeding," Nano Letters, vol. 4, No. 4, (Mar. 20, 2004), pp. 719-723, XP002537117, ISSN: 1530-6984.

* cited by examiner

*Primary Examiner*—H. (Holly) T Le
(74) *Attorney, Agent, or Firm*—Birch, Stewart, Kolasch & Birch, LLP (57) ABSTRACT

A core-shell structure with magnetic, thermal, and optical characteristics. The optical absorption band is tailorable by choice of the mixing ratio of the core/shell component to give the desired shell thickness. The core-shell structure is particularly suitable for biomedical applications such as MRI (magnetic resonance imaging) developer, specific tissue identification developer, and magnetic thermal therapy.

18 Claims, 16 Drawing Sheets

CORE-SHELL STRUCTURE WITH MAGNETIC, THERMAL, AND OPTICAL CHARACTERISTICS AND MANUFACTURING METHOD THEREOF

CROSS REFERENCE TO RELATED APPLICATION

This application claims the full benefit and priority of U.S. patent application Ser. No. 11/101,561, filed Apr. 8, 2005, entitled "Method for Forming Superparamagnetic Nanoparticles", and incorporates the entire contents of the application herein.

BACKGROUND

The present invention relates in general to core-shell materials. More particularly, it relates to core-shell structures with magnetic, thermal, and optical characteristics and manufacturing methods thereof.

Metal nanoshells are a novel type of composite nanoparticle consisting of a dielectric core such as silica covered by a thin metallic shell such as gold. Nanoshells possess highly favorable optical properties for optical imaging of tissue. The optical absorption of the gold shell includes the near-infrared (NIR) wavelength region (650~900 nm), a region of high-physiological transmissivity, which allows the NIR to be used as an excited source of gold nanoshells to identify tissue.

On the other hand, superparamagnetic nanoparticles are of intense interest, magnetizing strongly under an applied flied, but retaining no permanent magnetism once the field is removed. The on/off magnetic switching behavior is a particular advantage in magnetic-related applications. However, superparamagnetic nanoparticles are usually formed in organic solution or hydrophobic micelle, and thus prone to aggregation or precipitation when entering into body. Furthermore, superparamagnetic nanoparticles are hard to modify, and the diameter is too large for application in biomedicine.

At present, research and development of nanoshells are focused on the optical properties of the metal shell, while that of superparamagnetic nanoparticles are confined to magnetic-related applications. The present invention hereby provides a core-shell structure combining magnetic, thermal, and optical characteristics.

SUMMARY

According to one aspect of the invention, a novel core-shell structure is provided using magnetic particle as a core covered by a shell with light absorption behaviors, wherein at least one of the core and the shell possess exothermic behaviors, thus completing a core-shell structure having magnetic, thermal, and optical characteristics.

According to another aspect of the invention, a method for fabricating the novel core-shell structure is provided, comprising providing a magnetic nanoparticle, surface seeding the magnetic nanoparticle, and depositing a shell having optical absorption behaviors on the magnetic nanoparticle by reducing metal ions under catalysis of the seeded surface, thereby forming the core-shell structure.

Compared to conventional nanoshells or superparamagnetic nanoparticles, the core-shell' structures of the invention serve multi-functional purposes and can be used in a wide variety of fields based on their magnetic, optical and thermal characteristics, such as NMR developer, specific tissue identification developer, purification and magnetic thermal therapy (hyperthermia).

DESCRIPTION OF THE DRAWINGS

For a better understanding of the present invention, reference is made to a detailed description to be read in conjunction with the accompanying drawings, in which.

DETAILED DESCRIPTION

The core-shell structures of the invention features magnetic, exothermic, and light absorption behaviors, wherein the core has magnetic and optionally exothermic behaviors, while shell has light absorption and optionally exothermic behaviors.

In preferred embodiments, the structure is composed of a superparamagnetic core and a shell absorbing at least one of ultraviolet (UV), near-infrared (NIR), and visible (VIS) lights. The core is preferably made of at least one of Fe, Co, Ni, and oxides thereof. It will be appreciated, however, that the core can be made of any single or composite magnetic materials. The shell is preferably made of at least one of Au, Pt, and Ag. It will be further appreciated, however, that the shell can be made of any single or composite light absorbing materials.

The core-shell material of the invention thus includes a magnetic core and a light absorbing shell. On one hand, the magnetic properties of the core allow the material to be used in applications such as magnetic resonance imaging (MRI), magnetic guide, magnetic thermal therapy, and magnetic purification. On the other hand, the light absorbing shell often results in heat emission, and therefore, besides optical imaging of tissue, it can be used in application of thermal therapy of tumors.

The core-shell materials of the invention are preferably in the nanoscale size range, and more preferably have a diameter of about 6-150 nm. For example, the core-shell nanoparticle may comprise a core of about 5-100 nm in diameter, and a shell of about 1-50 nm thick. The optical absorption band of the shell is tailorable by choice of the mixing ratio of the core/shell component to give the desired shell thickness. If the diameter of the core-shell particle is too large, for example, exceeding 40 nm, aggregation or precipitation is likely to occur when entering into tissue. There is no particular size limitation when the core-shell particle is utilized in non-biomedical applications, purification for example. However, it may be difficult to modify the particle and the shell may easily peel when the diameter is too large.

The core-shell structure of the invention can be synthesized by surface seeding magnetic particle, followed by shell growing catalyzed by the seeded surface. The magnetic particle can be prepared by chemical co-precipitation. In the following, preparation of the magnetic particle will be explained by reference to iron-oxide nanoparticle. It should be noted, however, the magnetic particle can be prepared by other known methods and the material of the magnetic particle is not limited to iron oxide.

An aqueous solution comprising $Fe^{2+}$ and $Fe^{3+}$ ions in a ratio of about 1:2~1:3 is provided. Acid such as HCl can be optionally added to the aqueous solution to increase the $Fe^{2+}$ and $Fe^{3+}$ ion concentration. The pH value of the aqueous solution is adjusted to 12 or higher with alkali to improve iron oxide nanoparticle formation. The alkali may comprise an organic base or an inorganic base. The inorganic base is preferably an alkali metal hydroxide, such as NaOH.

Iron oxide nanoparticles are formed by subjecting the aqueous solution to ultrasonic vibration at about 40~70° C. Iron oxide nanoparticles are collected by a magnet. The iron oxide nanoparticles comprise $Fe_3O_4$ and/or $Fe_2O_3$ as a diameter of about 5~100 nm, preferably about 5-40 nm. Such diameter iron oxide has superparamagnetic characteristics.

FIGS. 1A~1D show an exemplary method of forming core-shell nanoparticle of the invention.

Figure 1A:
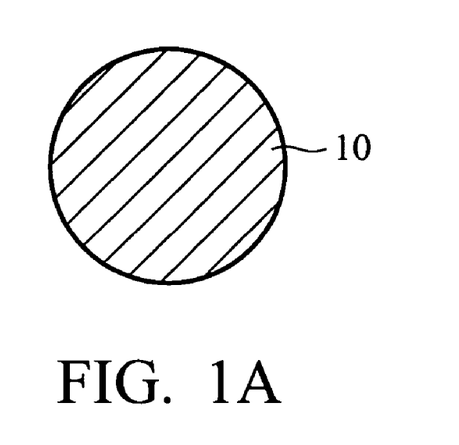
FIGS. 1A~1D are schematics of iron oxide-gold core-shell nanoparticle formation and modification process of an embodiment.

In FIG. 1A, a magnetic nanoparticle 10, such as iron oxide nanoparticle as synthesized herein, is dispersed into an aqueous solution. A physical or chemical treatment may be applied to improve the magnetic nanoparticle 10 in aqueous solution dispersion. The physical treatment may comprise ultrasonic vibration, and the chemical treatment may comprise the use of surfactant.

Figure 1B:
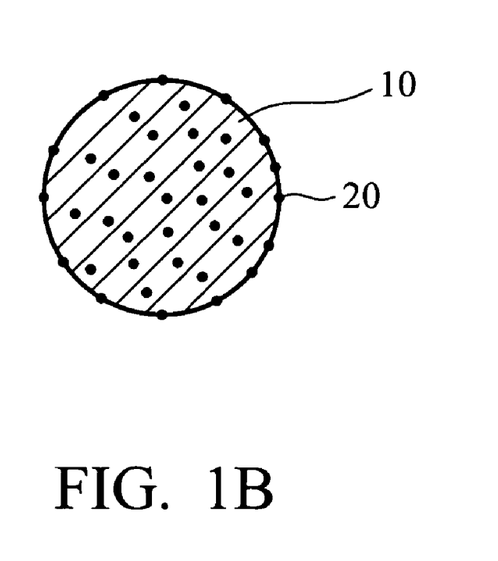

A metal seed layer 20 is then formed on the magnetic nanoparticle 10, as shown in FIG. 1B. The metal seed layer 20 may comprise Sn, used as a linker or nucleation site to improve metal reduction during subsequent shell formation.

Figure 1C:
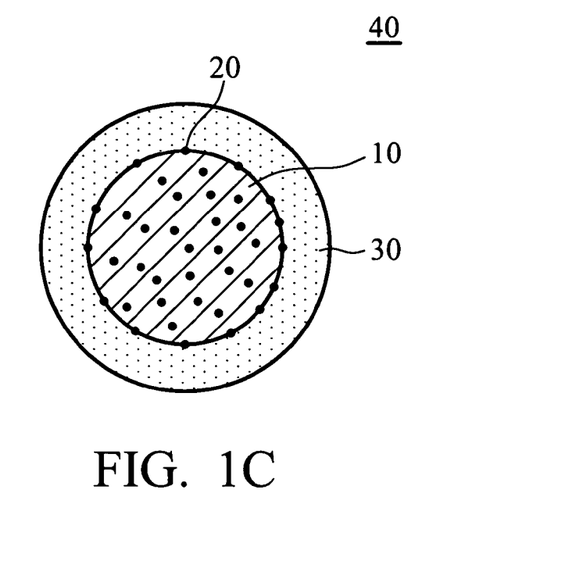

An electrolyte comprising metal ions and a reducing agent are added to the aqueous solution to form a core-shell nanoparticle 40, as shown in FIG. 1C. The electrolyte may comprise $AuCl_3$ and the reducing agent may comprise formaldehyde. The core-shell nanoparticle 40 thus formed is preferably collected by a magnet.

Absorption wavelength of the core-shell nanoparticle 40 can be tuned by different gold layer 30 thicknesses. By controlling the weight ratio of the magnetic core 10 to the shell 30, the shell thickness for the desired absorption region can be obtained. Taking iron oxide-gold core-shell nanoparticle as an example, the weight ratio of iron oxide core to gold shell is preferably about 1:0.03~1:10.

Figure 1D:
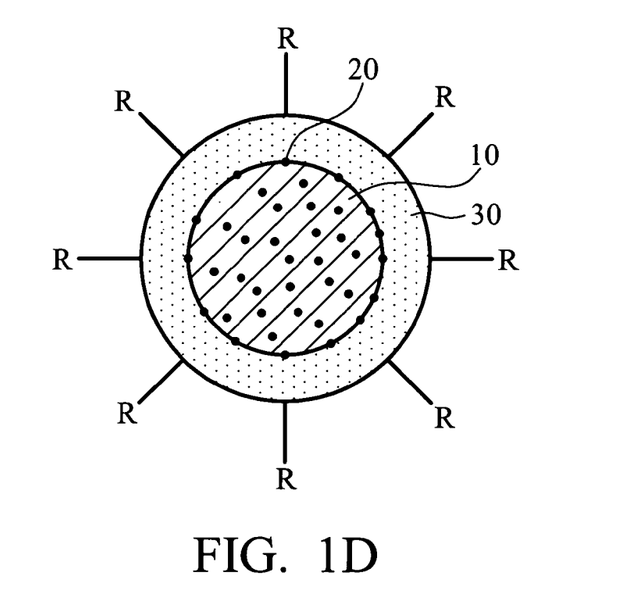
Figure 2A:
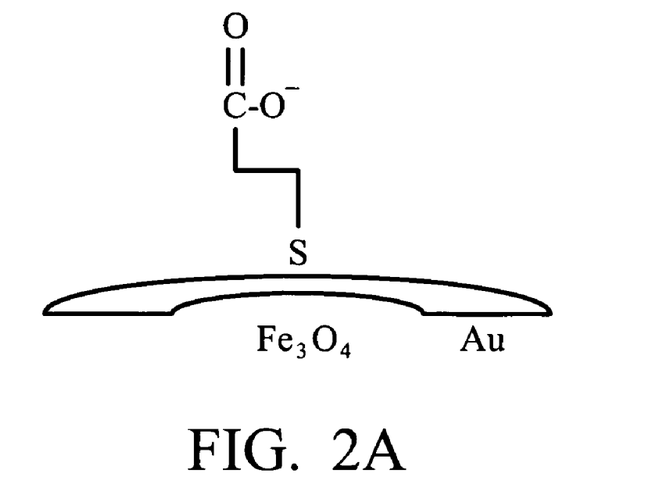
FIGS. 2A~2B are schematics of a modified iron oxide-gold core-shell nanoparticle.

Furthermore, the core-shell nanoparticle 40 can be modified with a modifier, as shown in FIG. 1D, to provide a functionalized surface. It is preferable that the functionalized surface is capable of forming biological functionality. When the modifier is 3-mercaptopropionic acid and the nanoparticle 40 is iron oxide-gold core-shell, it is modified as FIG. 2A.

Figure 2B:
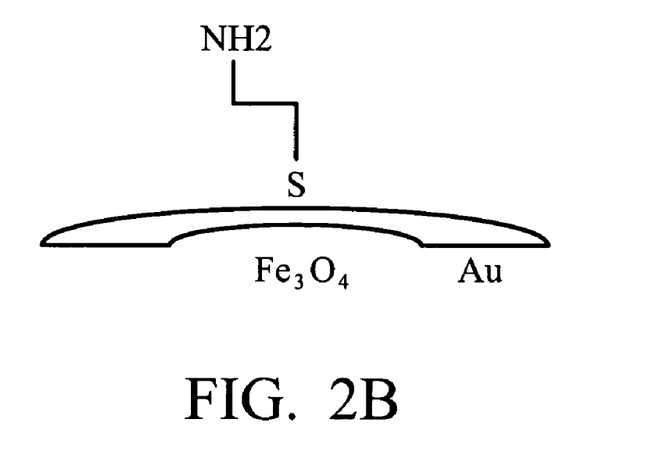

When the modifier is 2-aminoethanethiol and the nanoparticle 40 is iron oxide-gold core-shell, it is modified as FIG. 2B. The modified core-shell nanoparticle can be reacted with protein for tissue specific targeting.

Without intending to limit it in any manner, the present invention will be further illustrated by the following examples.

Example 1

Nanoparticle

An aqueous solution comprising $Fe^{2+}$ and $Fe^{3+}$ ions in a ratio of about 1M:2M was provided. 850 μm of 18M HCl was added to the aqueous solution. The pH value of the aqueous solution was adjusted to above 12 by adding 5M NaOH to improve iron oxide nanoparticle formation.

Next, the solution was subjected to ultrasonic vibration at about 50° C. for 50 minutes. The resulting iron oxide nanoparticle having a diameter of about 7±2.1 nm was collected by a magnet.

Figure 3:
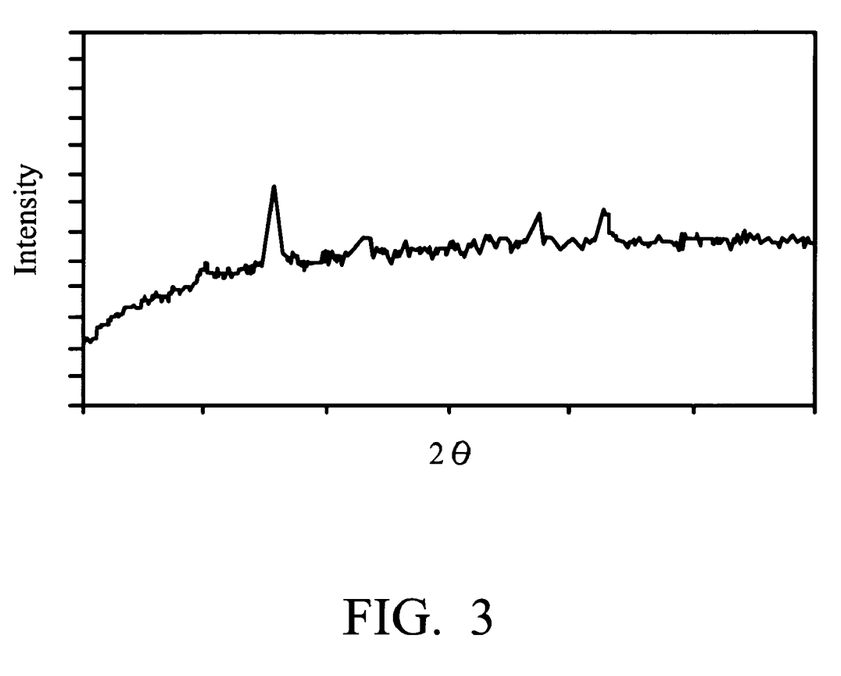
FIG. 3 is an iron oxide nanoparticle XRD diagram of Example 1.

The iron oxide nanoparticle was identified by X-ray diffraction (XRD), scanning electron microscopy (SEM), transmission electron microscopy (TEM), small-angle X-ray scattering (SAXS) and vibration sampling magnetometer (VSM). The result is disclosed as follows:

FIG. 3 is a XRD diagram of the iron oxide nanoparticle. It shows that the iron oxide nanoparticle comprises $Fe_3O_4$ diffraction peak.

Figure 4:
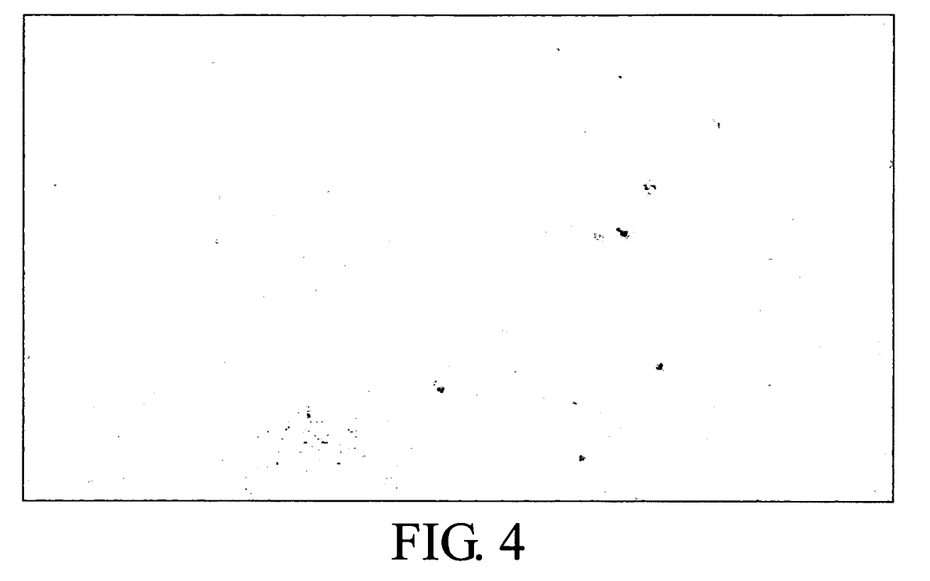
FIG. 4 is an iron oxide nanoparticle SEM picture of Example 1.
Figure 5:
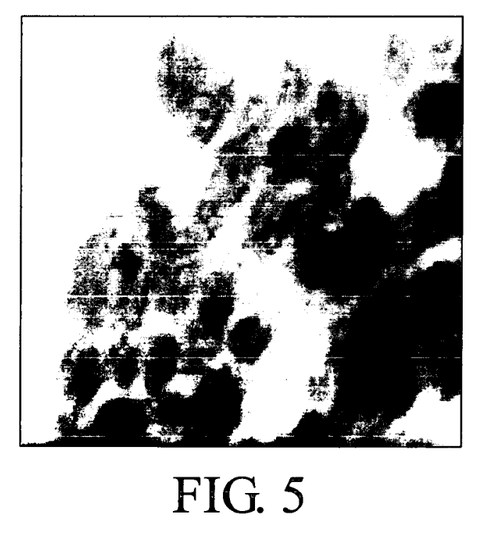
FIG. 5 is an iron oxide nanoparticle TEM picture of Example 1.

FIGS. 4 and 5 are respectively SEM and TEM pictures of the iron oxide nanoparticle. They show the iron oxide nanoparticle having a diameter is about 5~40 nm.

Figure 6:
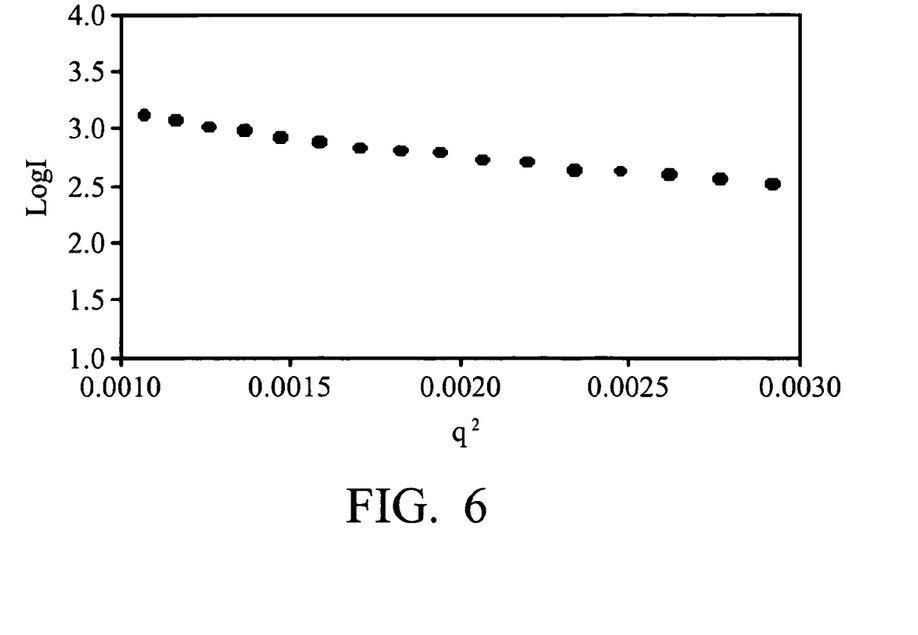
FIG. 6 is an iron oxide nanoparticle SAXA diagram of Example 1.

FIG. 6 is a SAXS diagram of the iron oxide nanoparticle. It shows that the iron oxide nanoparticle has a diameter of about 8.4 nm.

Figure 7:
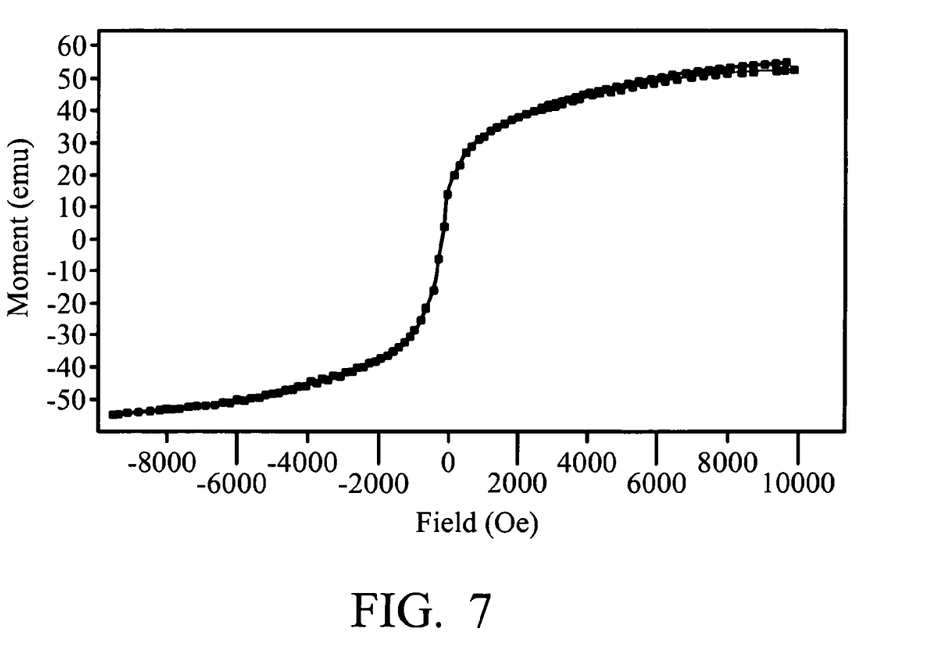
FIG. 7 is an iron oxide nanoparticle VSM diagram of Example 1.
Figure 8:
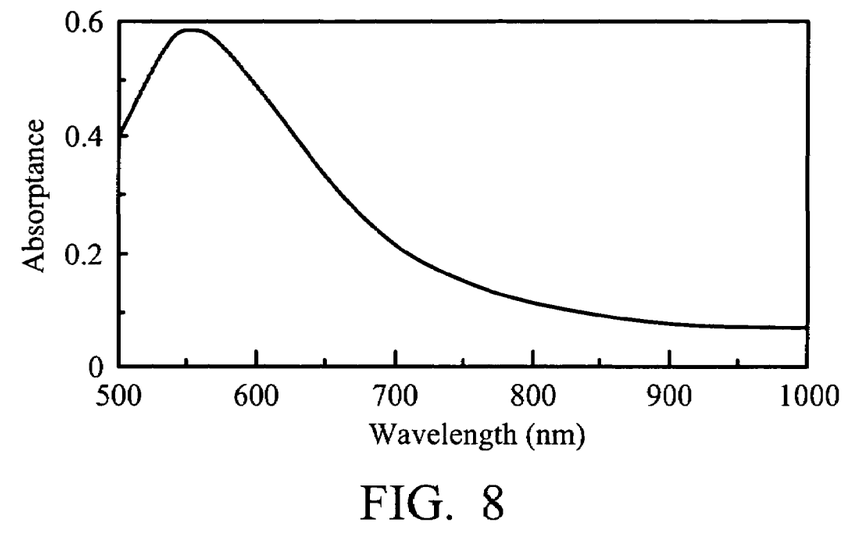
FIGS. 8~16 show respectively iron oxide-gold layer core-shell nanoparticle absorption spectrums of Example 2~10.
Figure 9:
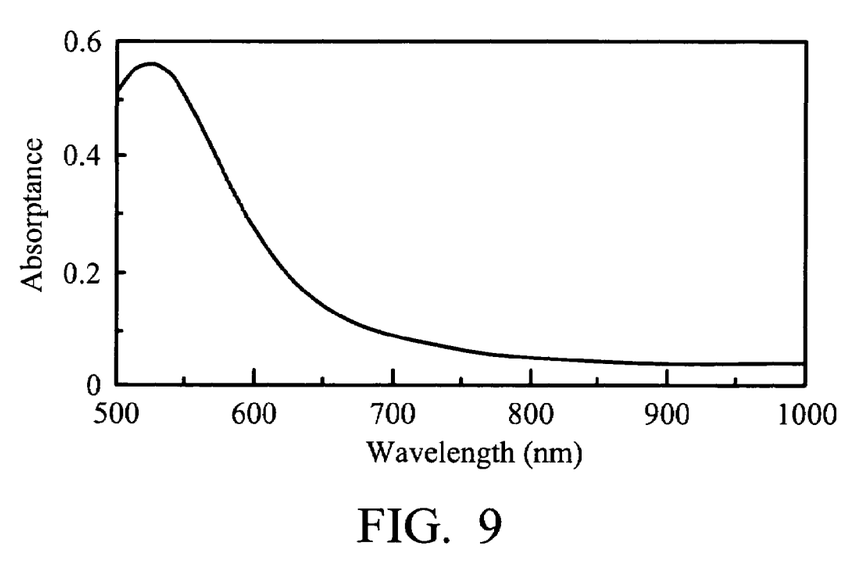
Figure 10:
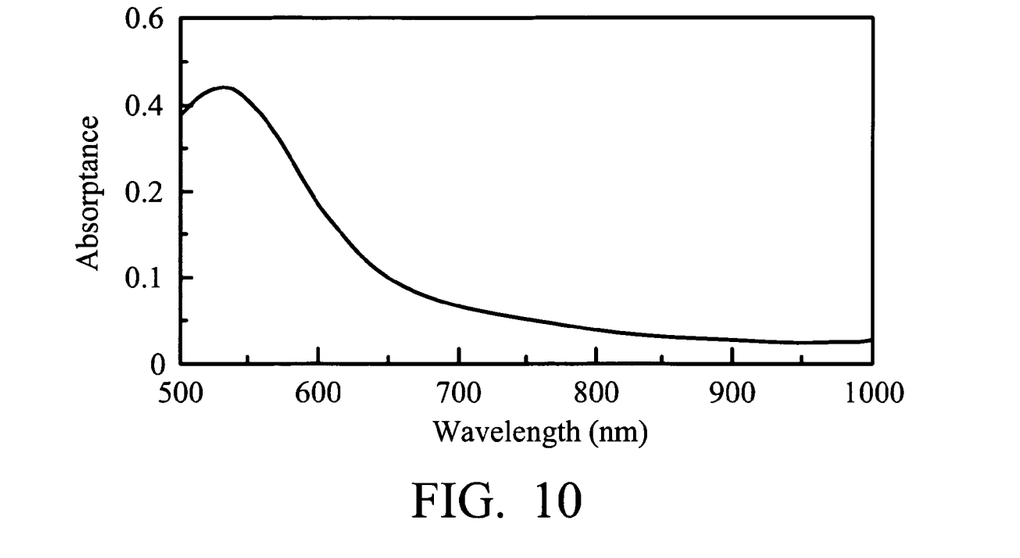
Figure 11:
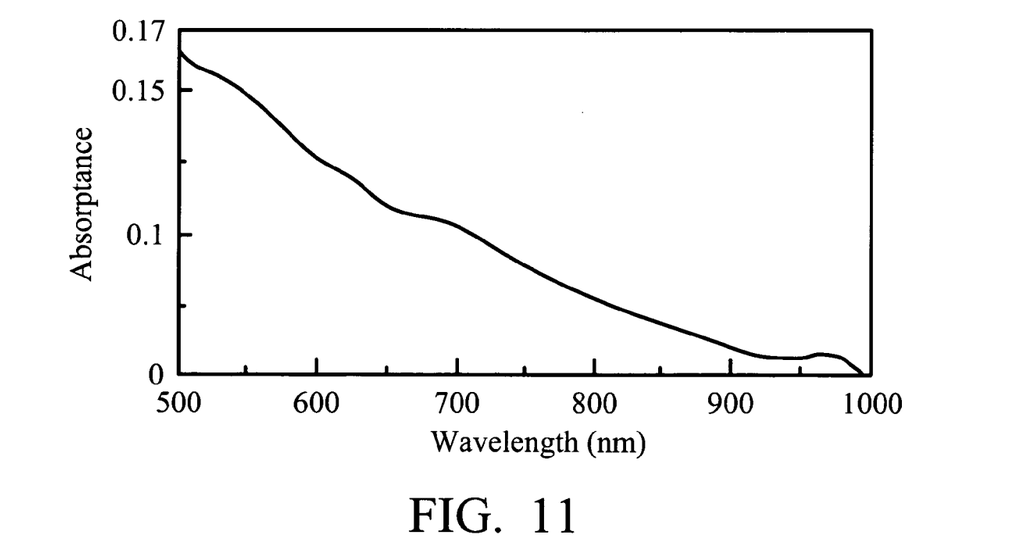
Figure 12:
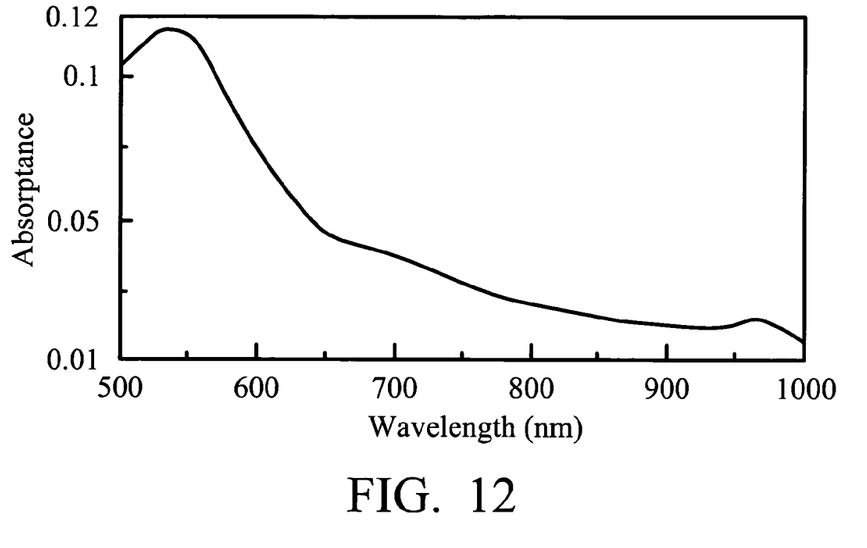
Figure 13:
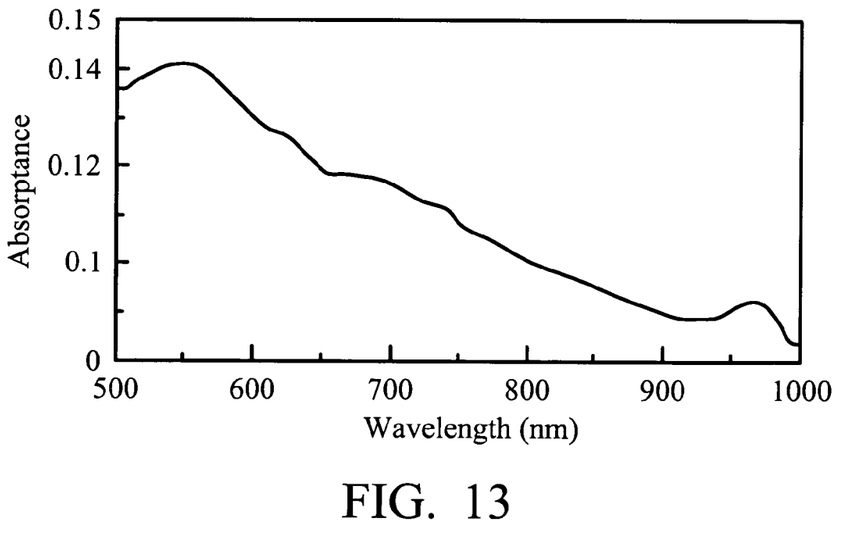
Figure 14:
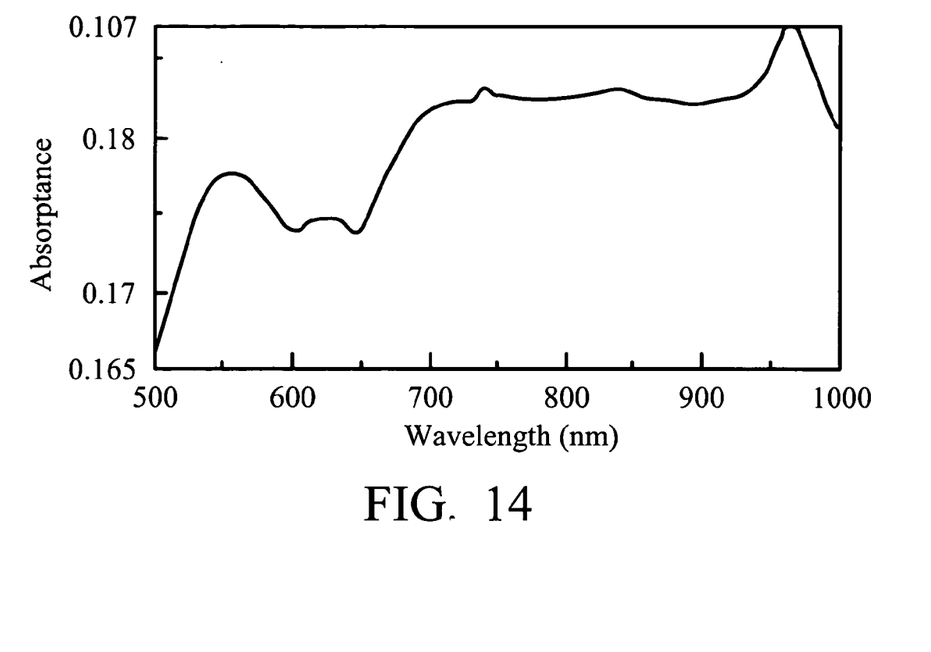
Figure 15:
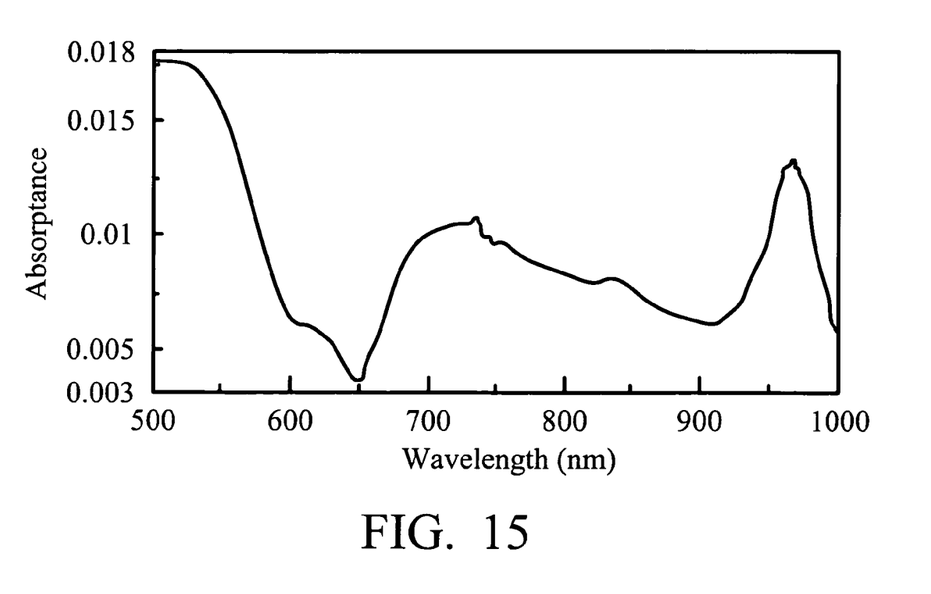
Figure 16:
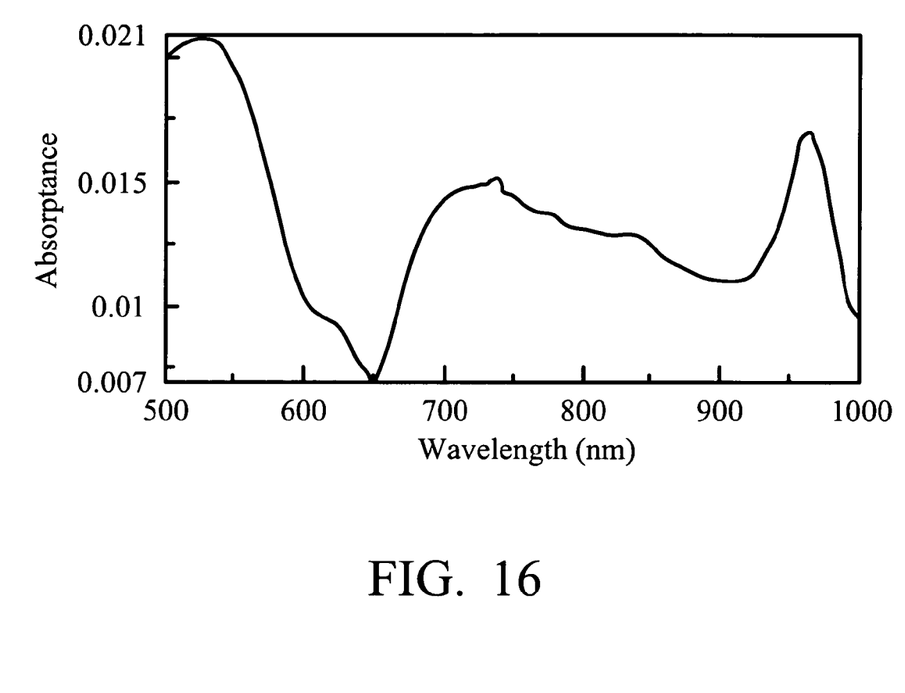
Figure 17:
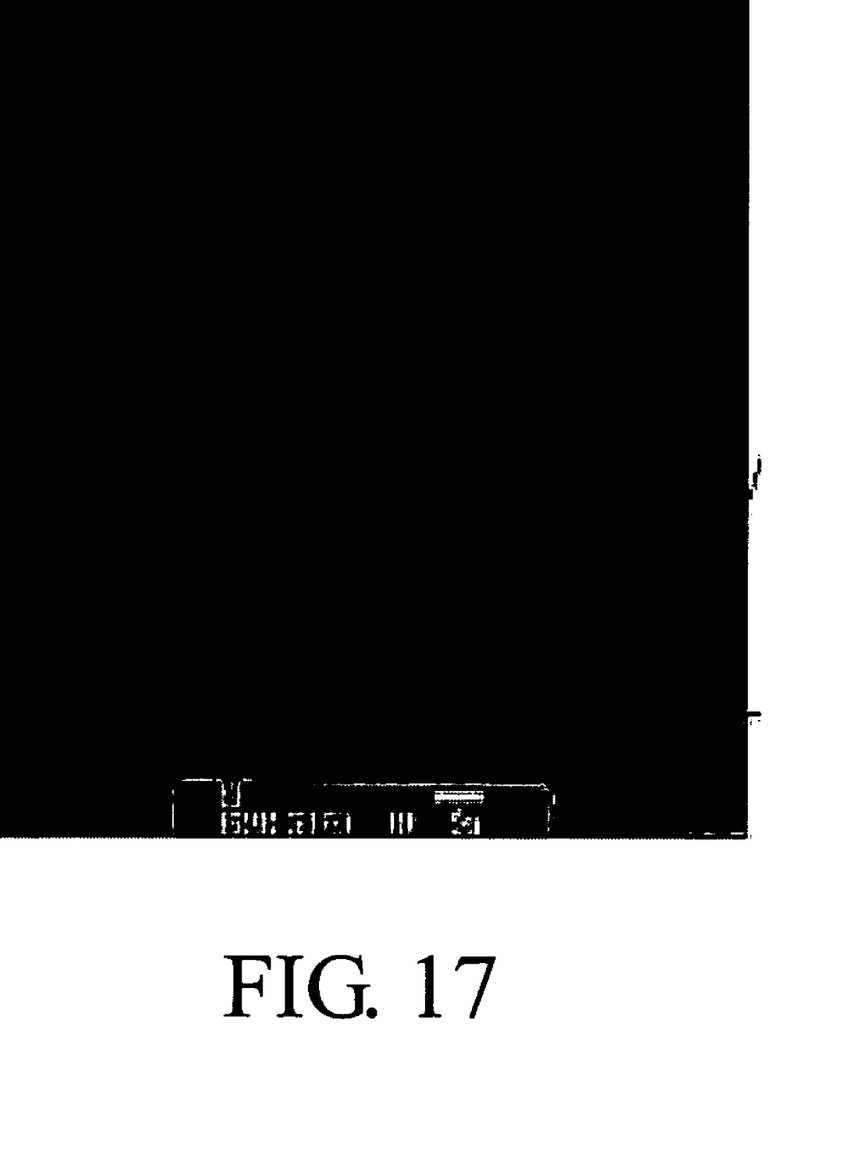
FIG. 17 is an iron oxide-gold layer core-shell nanoparticle TEM picture of Example 3.
Figure 18:
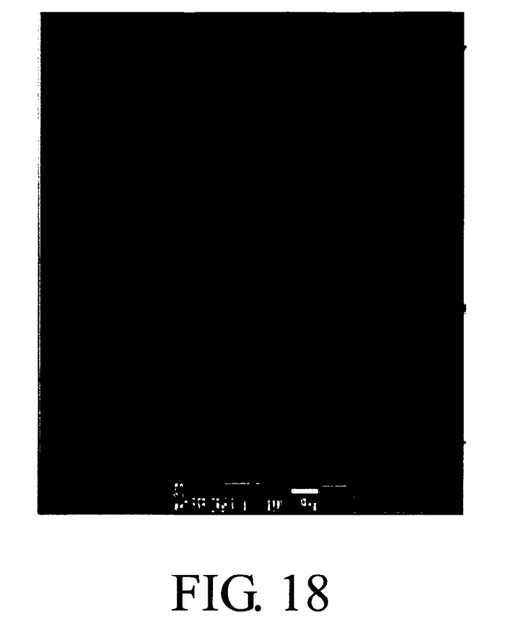
FIG. 18 is an iron oxide-gold layer core-shell nanoparticle TEM picture of Example 4.
Figure 19:
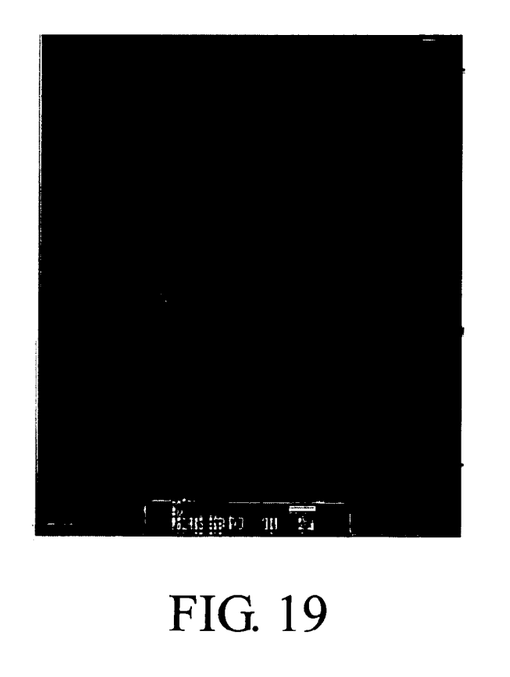
FIG. 19 is an iron oxide-gold layer core-shell nanoparticle TEM picture of Example 8.
Figure 20:
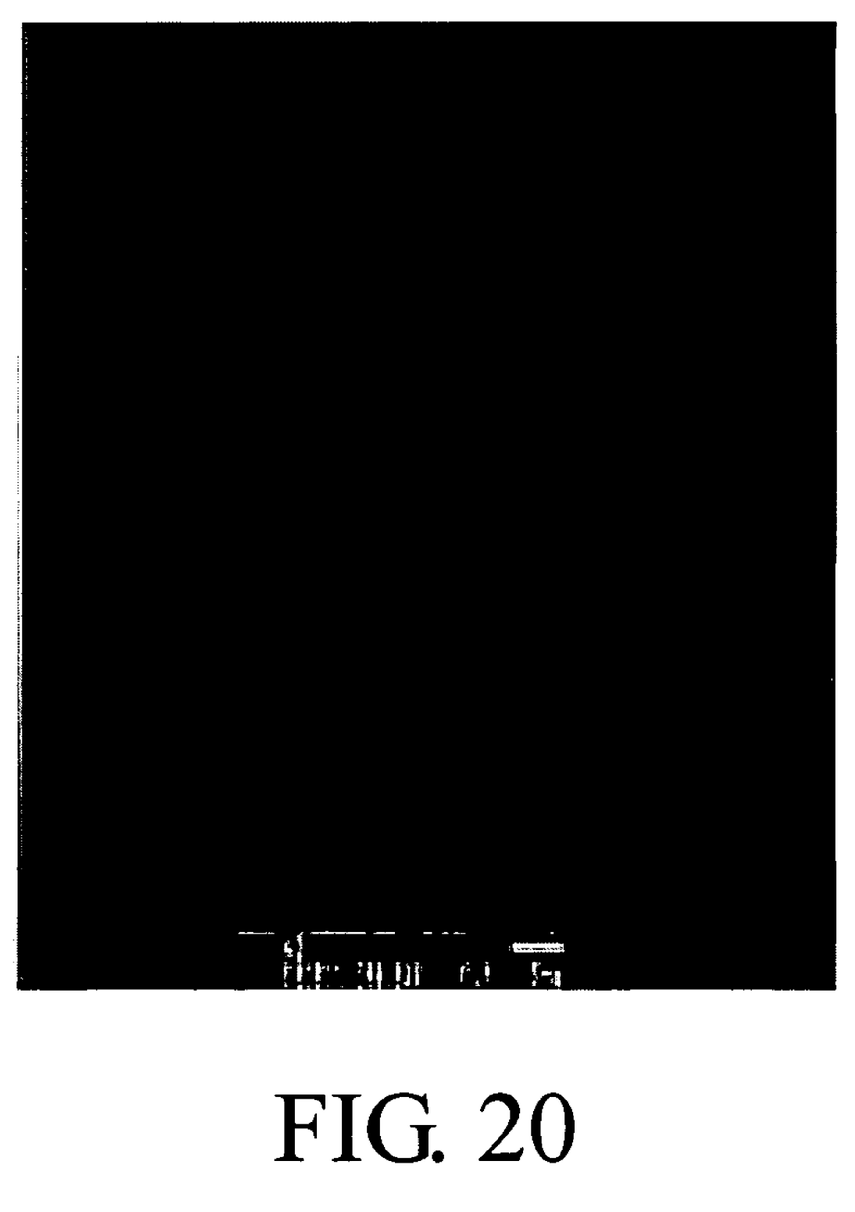
FIG. 20 is an iron oxide-gold layer core-shell nanoparticle TEM picture of Example 10.

FIG. 7 is a VSM diagram of the iron oxide nanoparticle. It shows that the iron oxide nanoparticle has a magnetization of about 54.6 emu/g, and thus the iron oxide nanoparticle is superparamagnetic.

Examples 2~10

Core-Shell Nanoparticle

Iron oxide nanoparticles of Example 2~10 were formed as follows:

An iron oxide nanoparticle was dispersed to an aqueous solution and an ultrasonic vibration treatment applied to the aqueous solution to improve the iron oxide nanoparticle dispersion. $2.5*10^{-3}$ M $SnCl_2$ was added into the aqueous solution to form a Sn metal seed layer on the iron oxide nanoparticle surface. 25 mM $AuCl_3$ and 15 mM $K_2CO_3$ were reacted overnight and added to the aqueous solution, with the Au to iron oxide weight ratio shown in Table 1. Formaldehyde was added to the aqueous solution to form an iron oxide-gold core-shell nanoparticle. The iron oxide-gold core-shell nanoparticle was collected by a magnet. The absorption spectrums and TEM pictures of Example 2~10 are listed in Table 1.

TABLE 1

|  | iron oxide: Au | Absorption Spectrum | TEM |
| --- | --- | --- | --- |
| Example 2 | 1:0.03 | FIG. 8 |  |
| Example 3 | 1:0.04 | FIG. 9 | FIG. 17 |
| Example 4 | 1:0.05 | FIG. 10 | FIG. 18 |
| Example 5 | 1:0.06 | FIG. 11 |  |
| Example 6 | 1:0.1 | FIG. 12 |  |
| Example 7 | 1:0.2 | FIG. 13 |  |

TABLE 1-continued

| | iron oxide: Au | Absorption Spectrum | TEM |
|---|---|---|---|
| Example 8 | 1:1 | FIG. 14 | FIG. 19 |
| Example 9 | 1:5 | FIG. 15 | FIG. 20 |
| Example 10 | 1:10 | FIG. 16 | FIG. 20 |

FIGS. 8~16 are absorption spectrums of the iron oxide nanoparticle. They show the iron oxide nanoparticles NIR absorption peaks excited by VU.

FIGS. 17~20 are TEM pictures of the iron oxide nanoparticle. They show the iron oxide nanoparticle has a diameter of about 10~50 nm.

Example 11

Modified Core-Shell Nanoparticle

Figure 21:
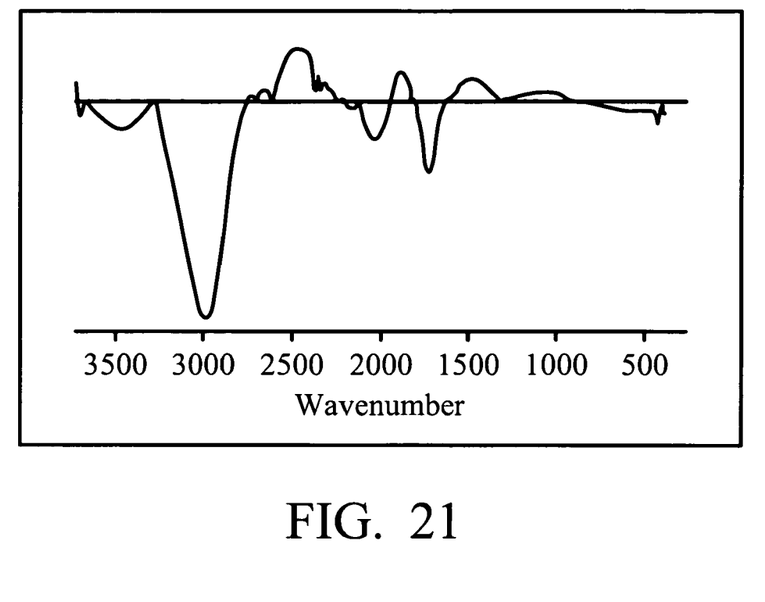
FIG. 21 shows modified iron oxide-gold layer core-shell nanoparticle IR spectrums of Example 11.

Iron oxide-gold core-shell nanoparticles of Example 3 were modified with 10 mM 3-mercaptopropionic acid at room temperature for 2 hours to form a COOH group on the iron oxide-gold core-shell nanoparticle surface, which was collected by a magnet with about 75% yield. Its IR spectrum is shown in FIG. 21.

Example 12

Modified Core-Shell Nanoparticle

Figure 22:
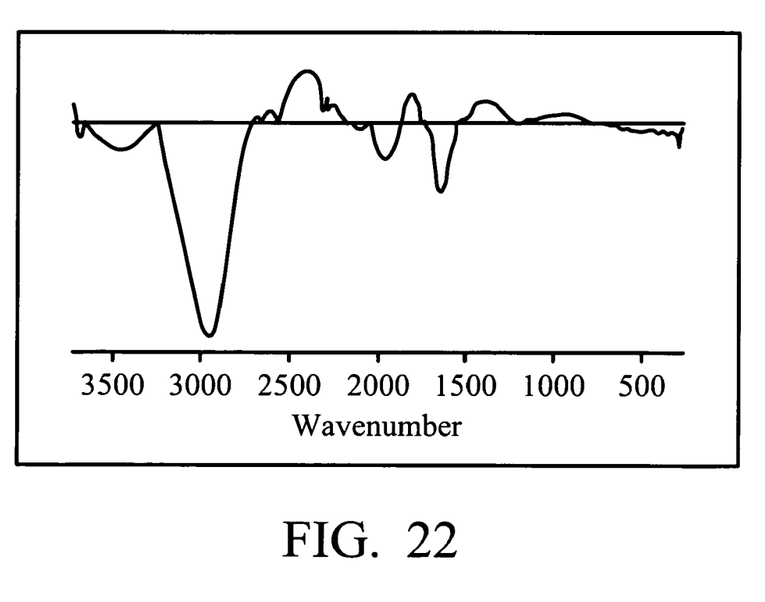
FIG. 22 shows modified iron oxide-gold layer core-shell nanoparticle IR spectrums of Example 12.

Iron oxide-gold core-shell nanoparticles of Example 10 were modified with 10 mM 3-mercaptopropionic acid at room temperature for 2 hours to form a COOH group on the iron oxide-gold core-shell nanoparticle surface, which was collected by a magnet with about 75% yield. Its IR spectrum is shown in FIG. 22.

Example 13

Modified Core-Shell Nanoparticle

Figure 23:
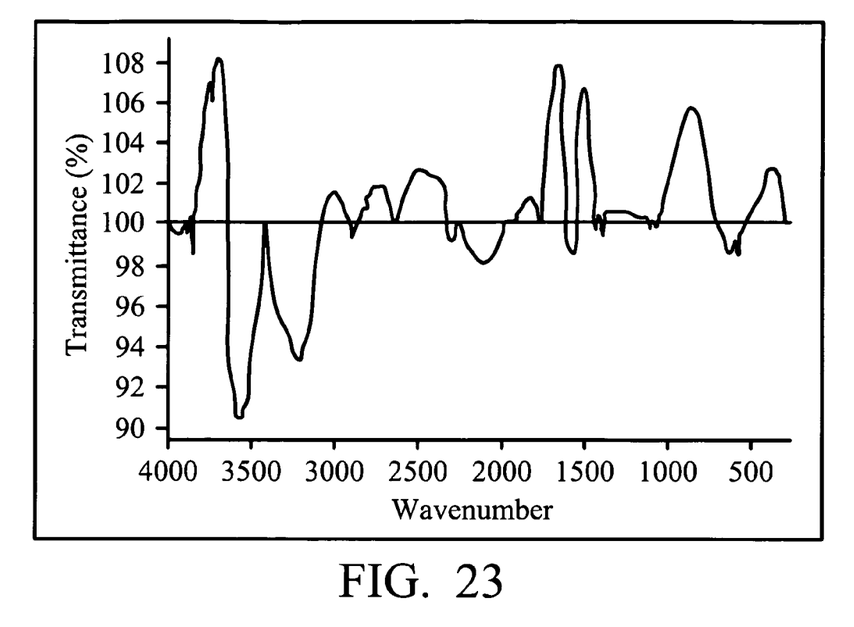
FIG. 23 shows modified iron oxide-gold layer core-shell nanoparticle IR spectrums of Example 13.

Iron oxide-gold core-shell nanoparticles of Example 3 were modified with 10 mM 2-aminoethanethiol at room temperature for 2 hours to form a NH$_2$ group on the iron oxide-gold core-shell nanoparticle surface, which was collected by a magnet with about 77% yield. Its IR spectrum is shown in FIG. 23.

Example 14

Modified Core-Shell Nanoparticle

Figure 24:
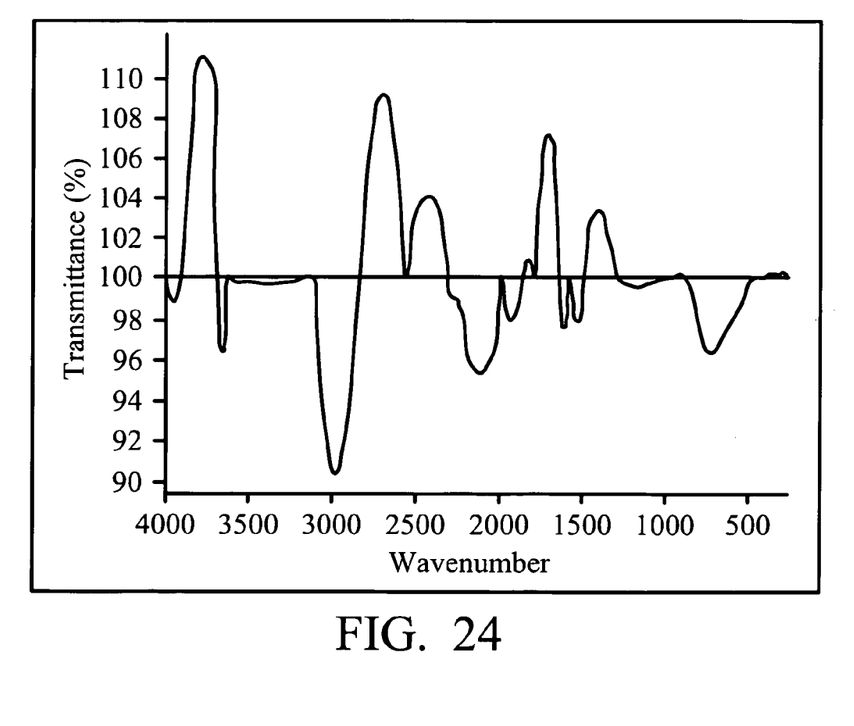
FIG. 24 shows modified iron oxide-gold layer core-shell nanoparticle IR spectrums of Example 14.

Iron oxide-gold core-shell nanoparticles of Example 10 were modified with 10 mM 2-aminoethanethiol at room temperature for 2 hours to form a NH$_2$ group on the iron oxide-gold core-shell nanoparticle surface, which was collected by a magnet with about 77% yield. Its IR spectrum is shown in FIG. 24.

The core-shell structure having magnetic, thermal, and optical characteristics in accordance with the invention comprises the following features:

1. The core-shell structure can be used in many fields based on their magnetic, optical and thermal characteristics, such as NMR developer, specific tissue identification developer, purification and magnetic thermal therapy (hyperthermia).

2. The optical absorption band is tailorable by choice of the mixing ratio of the core/shell component to give the desired shell thickness.

3. The core-shell structure is easily modified, and thus it is suitable for a wide variety of targeting therapies.

4. The core and shell of the present invention are bonded via chemical bonding, and thus the shell does not easily peel.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A core-shell structure having magnetic, exothermic, and light absorption behaviors with a metal seed layer formed between the core and the shell.

2. The core-shell structure as claimed in claim 1, wherein the core has magnetic and optionally exothermic behaviors.

3. The core-shell structure as claimed in claim 2, wherein the core has superparamagnetic behaviors.

4. The core-shell structure as claimed in claim 1, wherein the core comprises at least one of Fe, Co, Ni, and oxides thereof.

5. The core-shell structure as claimed in claim 1, wherein the shell has optical absorption and optionally exothermic behaviors.

6. The core-shell structure as claimed in claim 5, wherein the shell has at least one of ultraviolet (UV), near-infrared (NIR), and visible (VIS) light absorption.

7. The core-shell structure as claimed in claim 1, wherein the shell comprises at least one of Au, Pt, and Ag.

8. The core-shell structure as claimed in claim 1, wherein the core-shell structure is a core-shell nanoparticle.

9. The core-shell structure as claimed in claim 1, wherein the core has a diameter of about 5-100 nm, and the shell is about 1-50 nm thick.

10. The core-shell structure as claimed in claim 1, wherein the shell has a functionalized surface.

11. The core-shell structure as claimed in claim 10, wherein the shell has a functionalized surface capable of forming biological functionality.

12. A core-shell structure with magnetic, thermal, and optical characteristics, comprising an iron oxide-gold core-shell nanoparticle having magnetic, exothermic, and light absorption behaviors with a metal seed layer formed between the core and the shell.

13. The core-shell structure as claimed in claim 12, wherein the iron oxide core has superparamagnetic behaviors.

14. The core-shell structure as claimed in claim 13, wherein the gold shell has at least one of UV, NIR, and VIS absorption.

15. The core-shell structure as claimed in claim 12, wherein the core-shell nanoparticle has a diameter of about 6-150 nm.

16. The core-shell structure as claimed in claim 12, wherein the core-shell nanoparticle comprises a functionalized surface.

17. The core-shell structure as claimed in claim 16, wherein the core-shell nanoparticle comprises a functionalized surface capable of forming biological functionality.

18. The core-shell structure as claimed in claim 17, wherein the core-shell nanoparticle has a —S—R—COO⁻ or —S—R—NH$_2$ group where R represents alkylene.

* * * * *